US012663836B2

(12) United States Patent
Yeh

(10) Patent No.: US 12,663,836 B2
(45) Date of Patent: Jun. 23, 2026

(54) ELECTRONIC DEVICE INCLUDING HOUSING, DETECTABLE MODULE, AND SWITCH MECHANISM INCLUDING PUSHING MEMBER AND LIMITING MEMBER

(71) Applicant: Getac Technology Corporation, New Taipei City (TW)

(72) Inventor: Hsi-Yang Yeh, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 113 days.

(21) Appl. No.: 18/742,745

(22) Filed: Jun. 13, 2024

(65) Prior Publication Data

US 2025/0147556 A1     May 8, 2025

(30) Foreign Application Priority Data

Nov. 8, 2023     (CN) .......................... 202311482363.9

(51) Int. Cl.
*G06F 1/16*          (2006.01)
(52) U.S. Cl.
CPC .................................. *G06F 1/1679* (2013.01)
(58) Field of Classification Search
CPC ...... G06F 1/1679; G06F 1/1658; G06F 1/187; G06F 1/188; G06F 1/1635; H04M 1/0262
See application file for complete search history.

(56) References Cited

U.S. PATENT DOCUMENTS 5,717,571 A     2/1998  Helot
10,050,455 B2 *  8/2018  Hsu ......................... H02J 7/731
(Continued)

FOREIGN PATENT DOCUMENTS

CN      104380304 A     2/2015
CN      204571613 U     8/2015
(Continued)

OTHER PUBLICATIONS

Search Report issued on Jan. 20, 2025 for EP application No. 24192609.6, 9 pages.

(Continued)

*Primary Examiner* — Rockshana D Chowdhury
(74) *Attorney, Agent, or Firm* — COOPER LEGAL GROUP LLC

(57)          ABSTRACT

An electronic device includes a housing, a detachable electronic module, and a switch mechanism. The detachable electronic module is detachably disposed in an accommodating chamber of the housing. The switch mechanism includes a pushing member and a limiting member. The pushing member is movable relative to the housing between a locked position and an unlocked position. When the detachable electronic module is disposed in the accommodating chamber and the pushing member is located at the unlocked position, the detachable electronic module is able to be disassembled from the accommodating chamber. When the detachable electronic module is disposed in the accommodating chamber, the pushing member is located at the locked position, and the limiting member is located at a limited position, the detachable electronic module is fixed to the housing, and the pushing member is restricted by the limiting member and is not movable to the unlocked position.

18 Claims, 19 Drawing Sheets

(56) References Cited

U.S. PATENT DOCUMENTS

| | | | | |
|---|---|---|---|---|
| 2001/0019914 | A1 | 9/2001 | Wong et al. | |
| 2003/0223201 | A1* | 12/2003 | Son | G06F 1/184 |
| | | | | 361/752 |
| 2006/0148442 | A1* | 7/2006 | Liu | H04M 1/0262 |
| | | | | 455/347 |
| 2008/0136197 | A1* | 6/2008 | Lin | G06F 1/1616 |
| | | | | 292/251.5 |
| 2010/0188805 | A1* | 7/2010 | Zhou | H04M 1/0262 |
| | | | | 361/679.01 |
| 2011/0026199 | A1* | 2/2011 | Zhang | H01M 50/244 |
| | | | | 361/679.01 |
| 2011/0052955 | A1* | 3/2011 | Chu | H04M 1/0262 |
| | | | | 429/97 |
| 2011/0195292 | A1* | 8/2011 | Ouyang | H04M 1/0262 |
| | | | | 429/100 |
| 2012/0039025 | A1* | 2/2012 | Chen | H04M 1/0262 |
| | | | | 292/179 |
| 2012/0300427 | A1 | 11/2012 | Gong et al. | |
| 2013/0107431 | A1* | 5/2013 | Xu | G06F 1/1679 |
| | | | | 361/679.01 |
| 2013/0155591 | A1* | 6/2013 | Yamaguchi | G06F 1/1658 |
| | | | | 361/679.3 |
| 2017/0177037 | A1* | 6/2017 | Koo | G06F 1/1654 |
| 2017/0179448 | A1* | 6/2017 | Hsu | H02J 7/731 |
| 2019/0113954 | A1* | 4/2019 | Hsu | G06F 1/1626 |
| 2019/0164675 | A1* | 5/2019 | Srinivasan | E05C 19/16 |
| 2019/0377382 | A1* | 12/2019 | Ueki | G06F 1/1633 |
| 2021/0357004 | A1* | 11/2021 | Liu | G06F 1/20 |
| 2022/0113762 | A1* | 4/2022 | Campbell | G06F 1/1632 |
| 2022/0121251 | A1* | 4/2022 | Chang | G06F 1/187 |
| 2022/0279060 | A1* | 9/2022 | Wang | H04M 1/0262 |
| 2023/0097723 | A1 | 3/2023 | Wen et al. | |
| 2023/0116549 | A1* | 4/2023 | Olesiewicz | H05K 9/0081 |
| | | | | 361/818 |
| 2023/0156104 | A1* | 5/2023 | Kim | H04M 1/0277 |
| | | | | 455/566 |
| 2024/0427381 | A1* | 12/2024 | Chang | G06F 1/1656 |
| 2025/0147556 | A1* | 5/2025 | Yeh | G06F 1/1679 |

FOREIGN PATENT DOCUMENTS

| | | |
|---|---|---|
| CN | 113410563 A | 9/2021 |
| CN | 113741628 A | 12/2021 |
| TW | 534364 U | 5/2003 |
| TW | M417591 U1 | 12/2011 |

OTHER PUBLICATIONS

Dell Technologies, "Dell Latitude 7230 Rugged Extreme Tablet", https://www.dell.com/enus/shop/dell-laptops/latitude-7230-rugged-extremetablet/spd/latitude-12-7230-rugged-laptop, retrieved on May 7, 2024, 20 pages.

* cited by examiner

ELECTRONIC DEVICE INCLUDING HOUSING, DETECTABLE MODULE, AND SWITCH MECHANISM INCLUDING PUSHING MEMBER AND LIMITING MEMBER

CROSS-REFERENCE TO RELATED PATENT APPLICATION

This application claims the benefit of priority to China Patent Application No. 202311482363.9, filed on Nov. 8, 2023, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device having detachable electronic modules.

BACKGROUND OF THE DISCLOSURE

In use, detachable electronic modules (e.g., batteries and solid-state drives) on a conventional electronic device (e.g., a laptop computer) may be unintentionally detached from the conventional electronic device. For example, when the laptop computer falls to the ground, the detachable electronic modules (e.g., batteries and solid-state drives) may be easily detached from the laptop computer.

On the other hand, the detachable electronic modules can also easily be intentionally detached from the conventional electronic device. Accordingly, any person with malicious intent can easily detach the detachable electronic modules from the conventional electronic device. In a real-world situation, when the detachable electronic modules are solid-state drives that have confidential information stored therein, the person with malicious intent can easily remove the detachable electronic modules from the conventional electronic device and cause trouble for users thereof.

SUMMARY OF THE DISCLOSURE

The present disclosure provides an electronic device for improving on the issues associated with conventional electronic devices having detachable electronic modules that easily detach therefrom or are easily stolen by people with malicious intent.

One of the technical aspects adopted by the present disclosure is to provide an electronic device. The electronic device includes a housing, a detachable electronic module, and a switch mechanism. The housing includes an accommodating chamber, and the detachable electronic module is detachably assembled to the accommodating chamber of the housing. The switch mechanism is disposed on the housing, and the switch mechanism includes a pushing member and a limiting member. The pushing member is movable relative to the housing between a locked position and an unlocked position. When the detachable electronic module is assembled to the accommodating chamber and the pushing member is located at the unlocked position, the detachable electronic module is able to be disassembled from the accommodating chamber of the housing. When the detachable electronic module is assembled to the accommodating chamber, the pushing member is located at the locked position, and the limiting member is located at a limited position, such that the detachable electronic module is fixed to the housing, and the pushing member is limited by the limiting member and is not movable to the unlocked position.

Therefore, in the electronic device provided by the present disclosure, through the arrangement of the pushing member and the limiting member provided in the switch mechanism, when the detachable electronic module is assembled in the accommodating chamber and the pushing member and the limiting member are respectively located at the locked position and the limited position, the detachable electronic module is not easily detached from the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
FIG. 1 is a schematic perspective view showing a bottom side of an electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
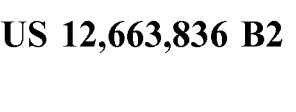
FIG. 2 is a schematic partial enlarged view of the electronic device according to the first embodiment of the present disclosure.
Figure 3:
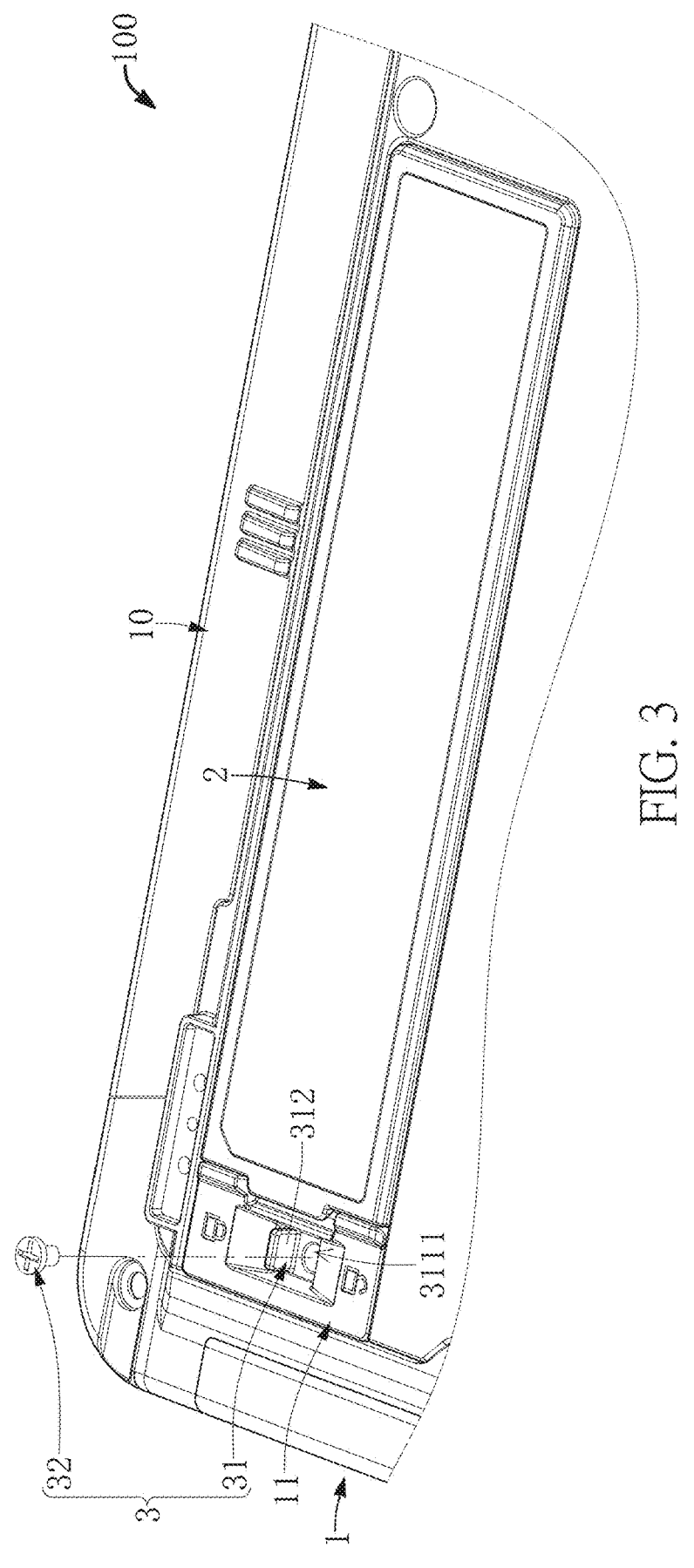
FIG. 3 is a schematic partial exploded view of the electronic device according to the first embodiment of the present disclosure.
Figure 4:
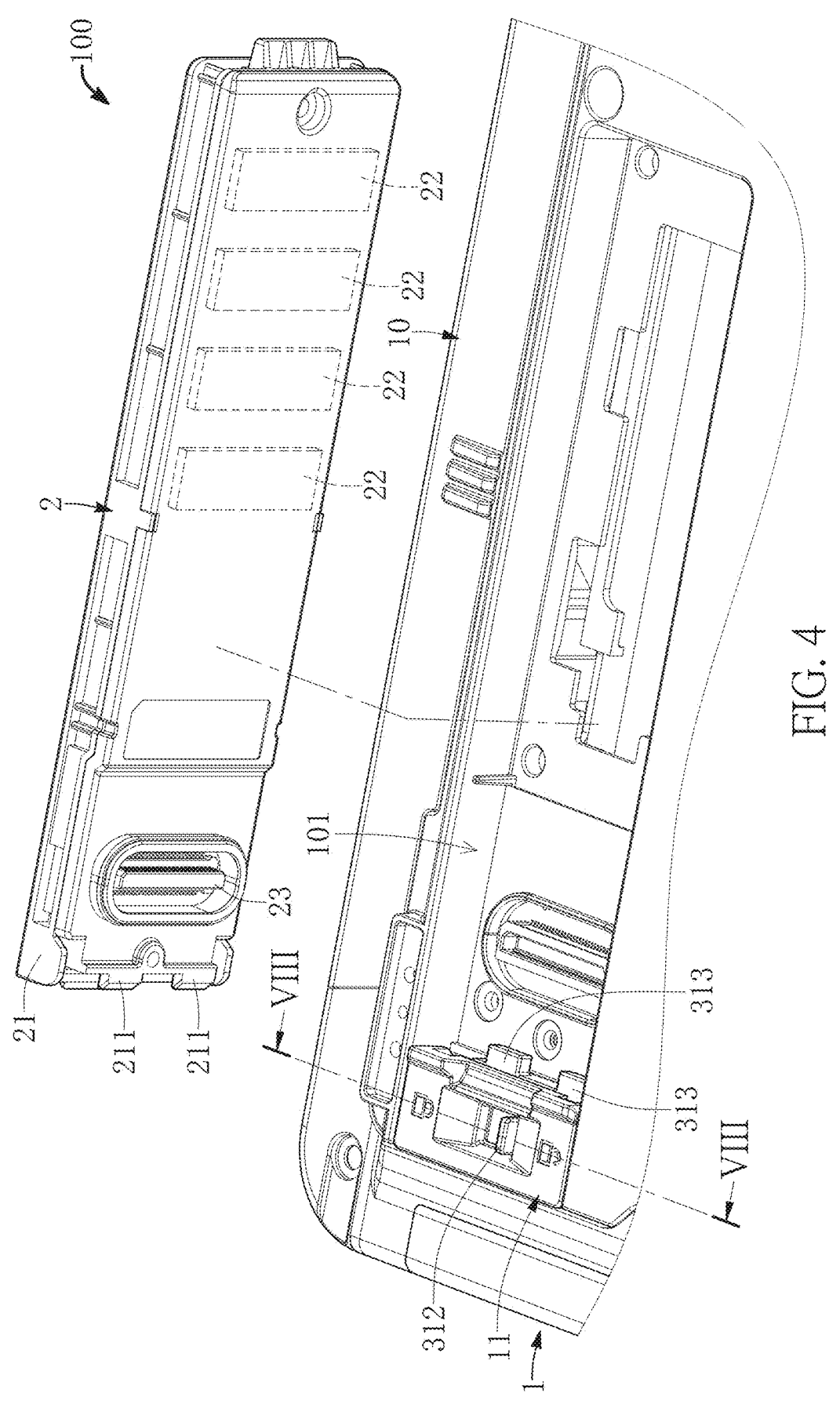
FIG. 4 is a schematic exploded view of a housing and a detachable electronic module of the electronic device according to the first embodiment of the present disclosure.
Figure 5:
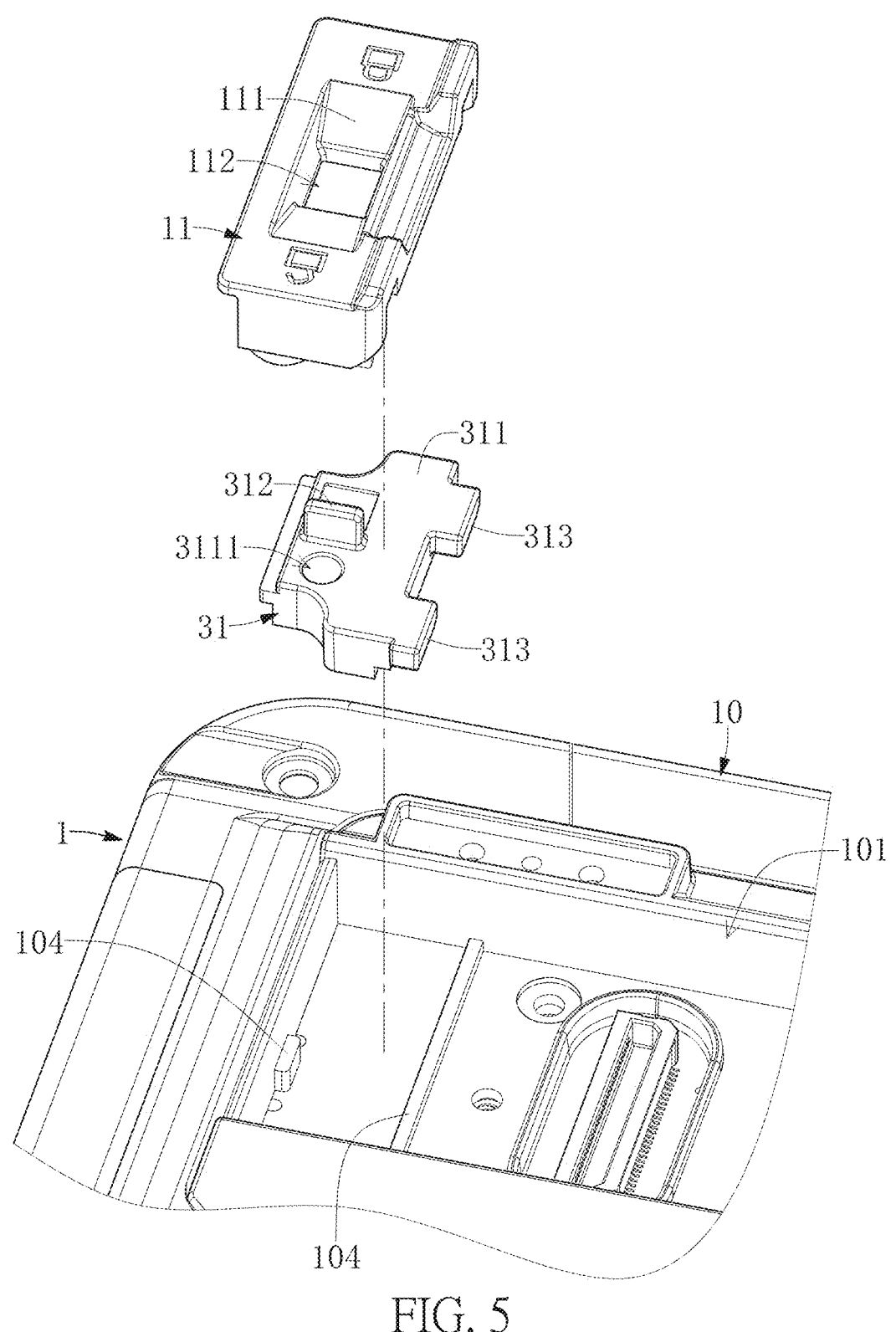
FIG. 5 is a schematic exploded view of the housing and a pushing member of the electronic device according to the first embodiment of the present disclosure.

As shown in FIG. 1 to FIG. 5, FIG. 1 is a schematic perspective view showing a bottom side of an electronic device according to a first embodiment of the present disclosure, FIG. 2 is a partial schematic enlarged view of the electronic device in the present embodiment, FIG. 3 is a partial schematic exploded view of the electronic device in the first embodiment, FIG. 4 is a schematic exploded view of a housing and a detachable electronic module of the electronic device in the present embodiment, and FIG. 5 is a schematic exploded view of the housing and a pushing member of the electronic device in the present embodiment.

The electronic device 100 in the present disclosure includes a housing 1, three detachable electronic modules 2 (e.g., detachable modules 2), and three switch mechanisms 3. The detachable modules 2 in this embodiment, for example, are detachable electronic modules, but the present disclosure is not limited thereto. Each of the detachable electronic modules 2 is detachably assembled to the housing 1, each of the switch mechanisms 3 is disposed on the housing 1, and each of the switch mechanisms 3 is disposed on one of the detachable electronic modules 2 adjacent thereto. Each of the switch mechanisms 3 is configured to provide a manipulation of a user, such that the detachable electronic modules 2 are fixed to the housing 1. Moreover, a quantity of the detachable electronic modules 2 and a quantity of the switch mechanisms 3 provided in the electronic device 100 can be changed according to practical requirements and are not limited by the present embodiment.

The electronic device 100 can be applied as a laptop computer, a tablet computer, etc., and is particularly suitable for use as a rugged computer. The rugged computer is suitable for use by units that need to process sensitive data, such as military units, intelligence units, etc., but is not limited by the present embodiment. If the electronic device 100 is used as the laptop computer, the electronic device 100 includes a screen, a keyboard, a hard disk drive and other components provided in the laptop computer. In the following description, only the differences between the electronic device 100 of the present disclosure and the conventional laptop computer will be described, and the parts that are not described in detail can be designed according to practical requirements with reference to the conventional laptop computer.

The housing 1 includes a housing body 10 and three switch shells 11. The housing body 10 includes three accommodating chambers 101, and each of the accommodating chambers 101 is configured to accommodate one of the detachable electronic modules 2. The housing body 10 is provided to be an outer housing and a main support structure of the electronic device 100, the three switch shells 11 are fixed to the housing body 10, and each of the switch shells 11 is used to shield and limit a movable range of a pushing member 31 of one of the switch mechanisms 3.

Each of the detachable electronic modules 2 is detachably assembled to one of the accommodating chambers 101 of the housing 1. The switch mechanism 3 includes the pushing member 31 and a limiting member 32. The pushing member 31 is movable relative to the housing 1 between a locked position and an unlocked position. In practice, the housing 1 can have guide structures 104 (e.g., various sliding grooves and/or various slide rails), a part of the pushing member 31 is slidably connected to the guide structures 104, and the pushing member 31 is slidable relative the housing 1 through the guide structures 104. The limiting member 32 can be a screw, but the present disclosure is not limited thereto. In the embodiment in which the limiting member 32 is the screw, a manipulation hole of the limiting member 32 is not crossed or slotted, and is a specially shaped hole. In other words, the limiting member 32 cannot be removed directly by using common tools (e.g., a screwdriver-crossed or a screwdriver-slotted).

As shown in FIG. 2, when the pushing member 31 is located at the locked position, the pushing member 31 is provided to limit and fix the detachable electronic module 2 to the housing 1, such that the user is basically unable to directly pull the detachable electronic module 2 and disassemble the detachable electronic module 2 from the accommodating chamber 101 (as shown in FIG. 4). In the situation shown in FIG. 2, the limiting member 32 is located at a limited position, and the pushing member 31 is limited by the limiting member 32, such that the pushing member 31 cannot be manipulated to be moved from the locked position shown in FIG. 2 to the unlocked position shown in FIG. 4. In other words, in the situation of FIG. 2, the user cannot disassemble the detachable electronic module 2 from the accommodating chamber 101 with bare hands when the user does not use any tool (e.g., a screwdriver).

As shown in FIG. 3 to FIG. 5, when the user uses a tool (e.g., a screwdriver) to disassemble the limiting member 32 from the housing 1, the pushing member 31 is no longer limited by the limiting member 32, and the pushing member 31 can be pushed to the unlocked position shown in FIG. 3, such that the user can pull the detachable electronic module 2 with their bare hands to disassemble the detachable electronic module 2 from the accommodating chamber 101.

In summary, in the electronic device 100 of the present disclosure, the housing 1, the switch mechanisms 3, and the detachable electronic modules 2 are provided to be in cooperation with each other, such that the user can fix the detachable electronic modules 2 to the housing 1 according to practical requirements, thereby preventing the detachable electronic modules 2 from being easily disassembled from the housing 1 by people with malicious intent and preventing the detachable electronic modules 2 from being easily detached from the housing 1.

Specifically, in a conventional rugged laptop computer provided for military or intelligence units that require processing of confidential information, in order to prevent the confidential information from being leaked, the confidential information is stored in a solid-state drive (SSD) that can be quickly and detachably assembled to the rugged laptop computer. When the relevant personnel get off work, the solid-state drive can be disassembled and placed in a specific place for safekeeping. During work hours, the relevant personnel can reassemble the solid-state drive to the rugged laptop computer. However, in this application scenario, when the solid-state drive is assembled to the rugged laptop computer, the solid-state drive can easily be unexpectedly detached from the rugged laptop computer by an external force, causing trouble to the user. In addition, when the solid-state drive is assembled on the rugged laptop computer, the solid-state drive can easily be deliberately disassembled from the rugged laptop computer by people with malicious intent.

The electronic device 100 of the present disclosure is provided with the switch mechanisms 3, such that the relevant personnel can manipulate the limiting member 32 to be located at the limited position for preventing the pushing member 31 from being manipulated, thereby fixing the detachable electronic modules 2 to the housing 1. Accordingly, the detachable electronic modules 2 can be prevented from being detached from the housing 1, thereby effectively solving the above issues of the conventional rugged laptop computer. Furthermore, in the embodiment in which the limiting member 32 is the screw, the size of the threaded hole and the shape of the operating hole of the limiting member 32 can have a special design, so that if the electronic device 100 is stolen by someone other than the user, the detachable electronic modules 2 still cannot be quickly disassembled from the housing 1 with an appropriate tool.

Figure 6:
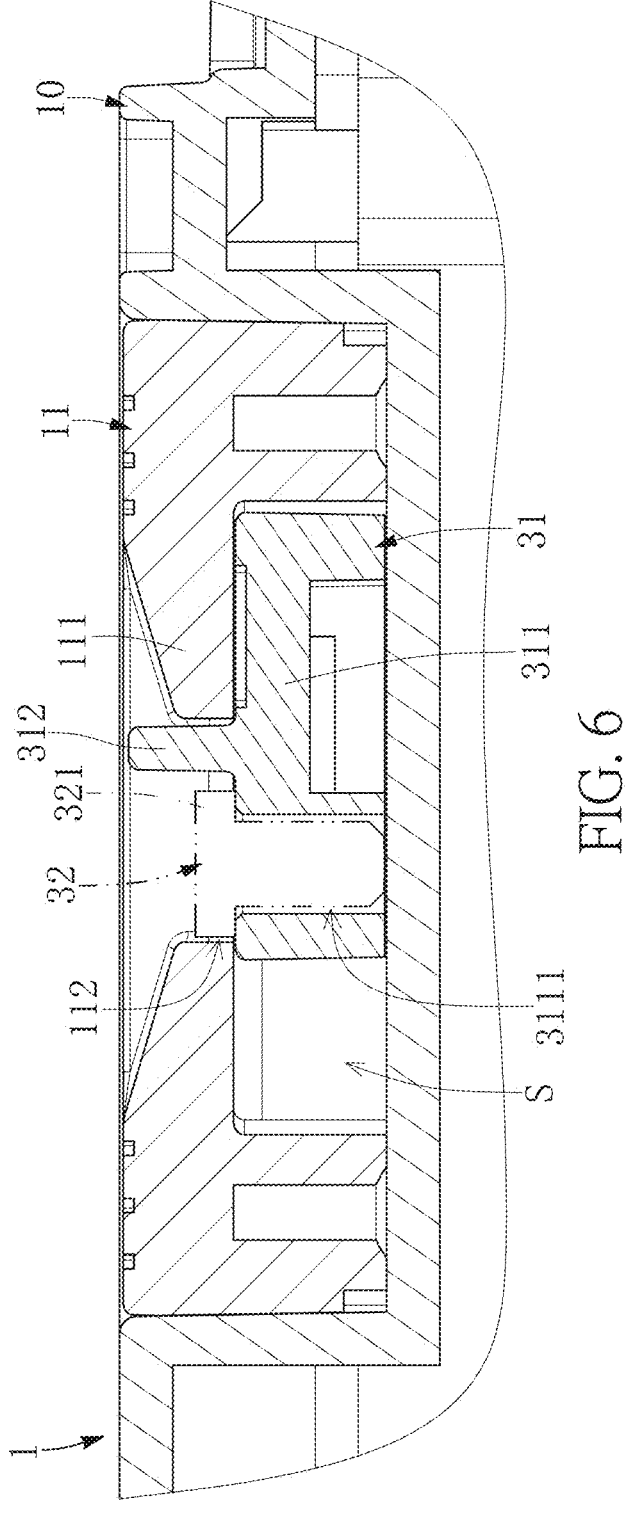
FIG. 6 is a schematic cross-sectional view taken along line VI-VI of FIG. 2 according to the first embodiment of the present disclosure.
Figure 7:
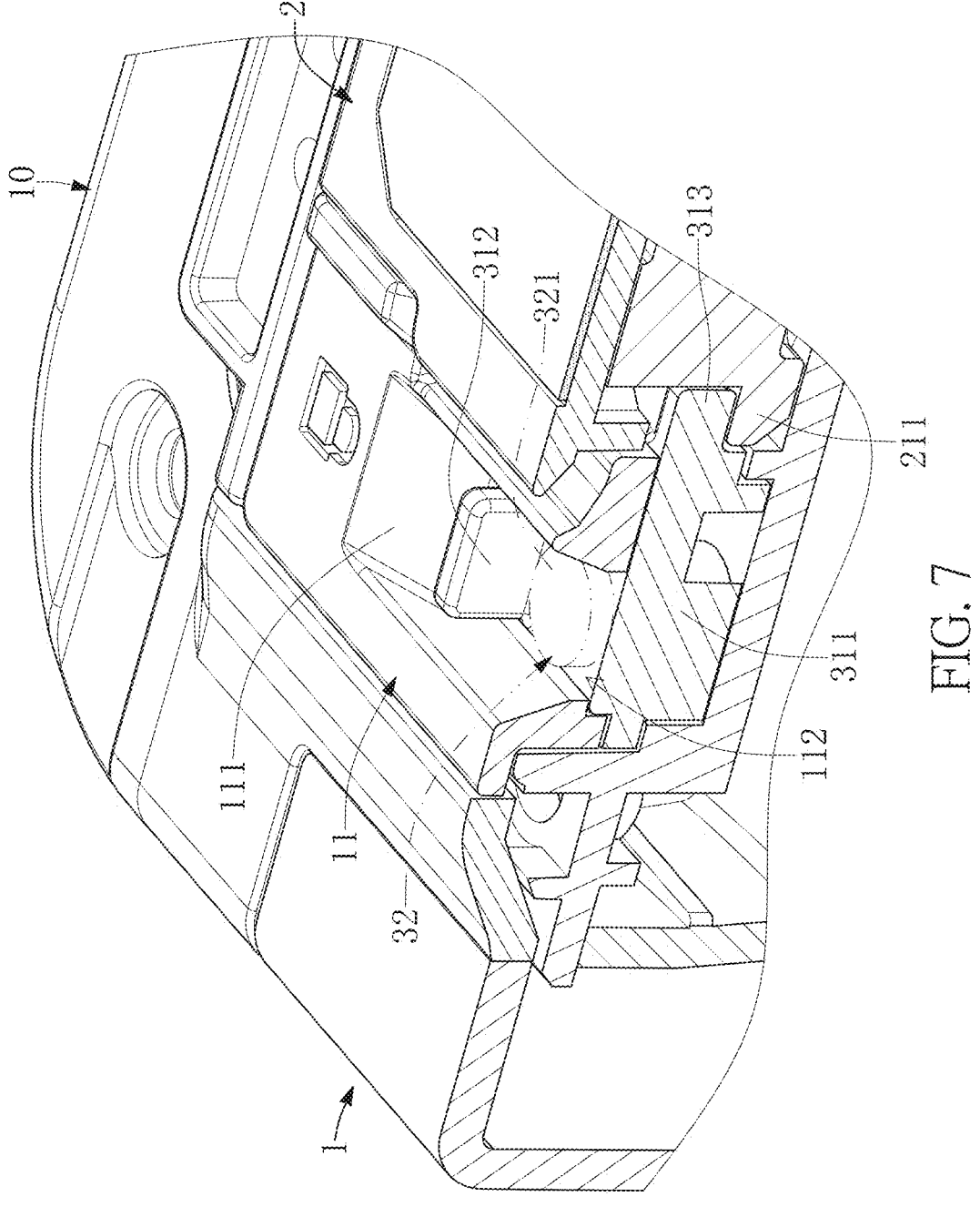
FIG. 7 is a schematic cross-sectional view of the electronic device according to the first embodiment of the present disclosure.
Figure 8:
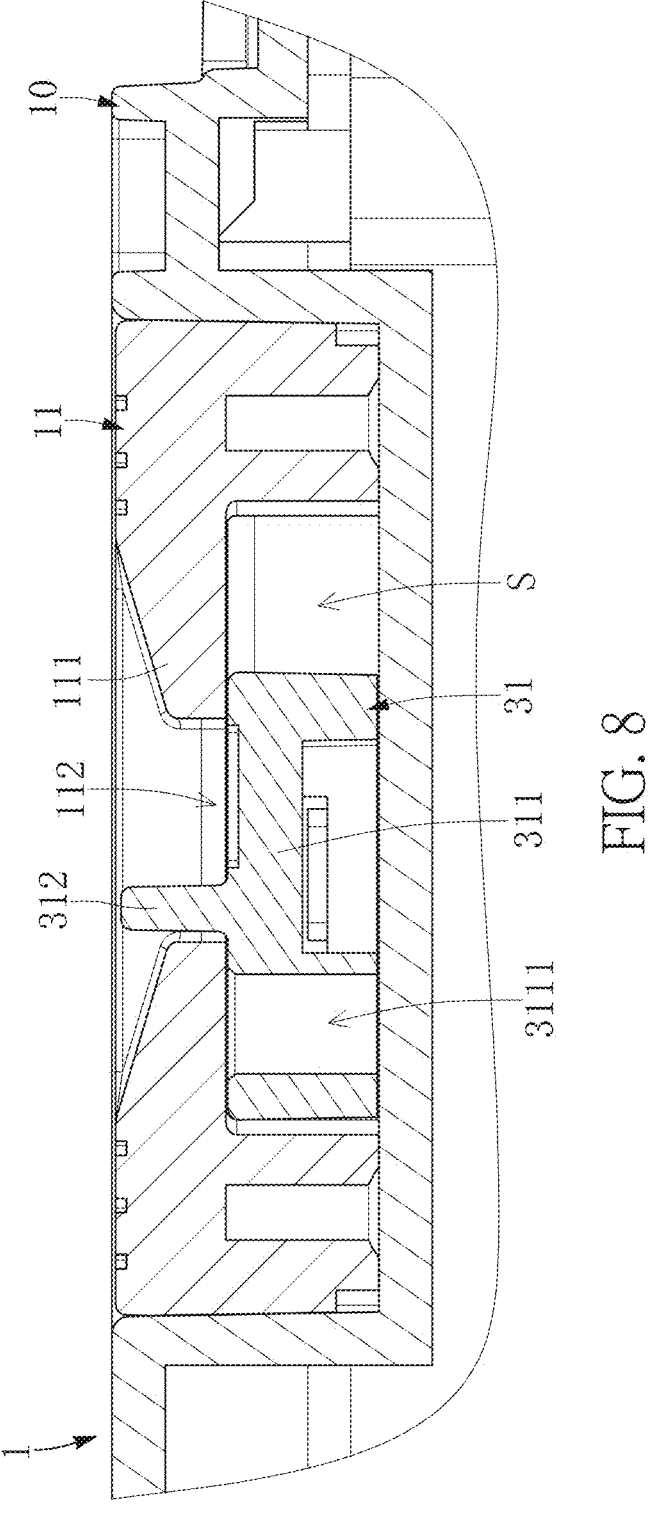
FIG. 8 is a schematic cross-sectional view taken along line VIII-VIII of FIG. 4 according to the first embodiment of the present disclosure.
Figure 9:
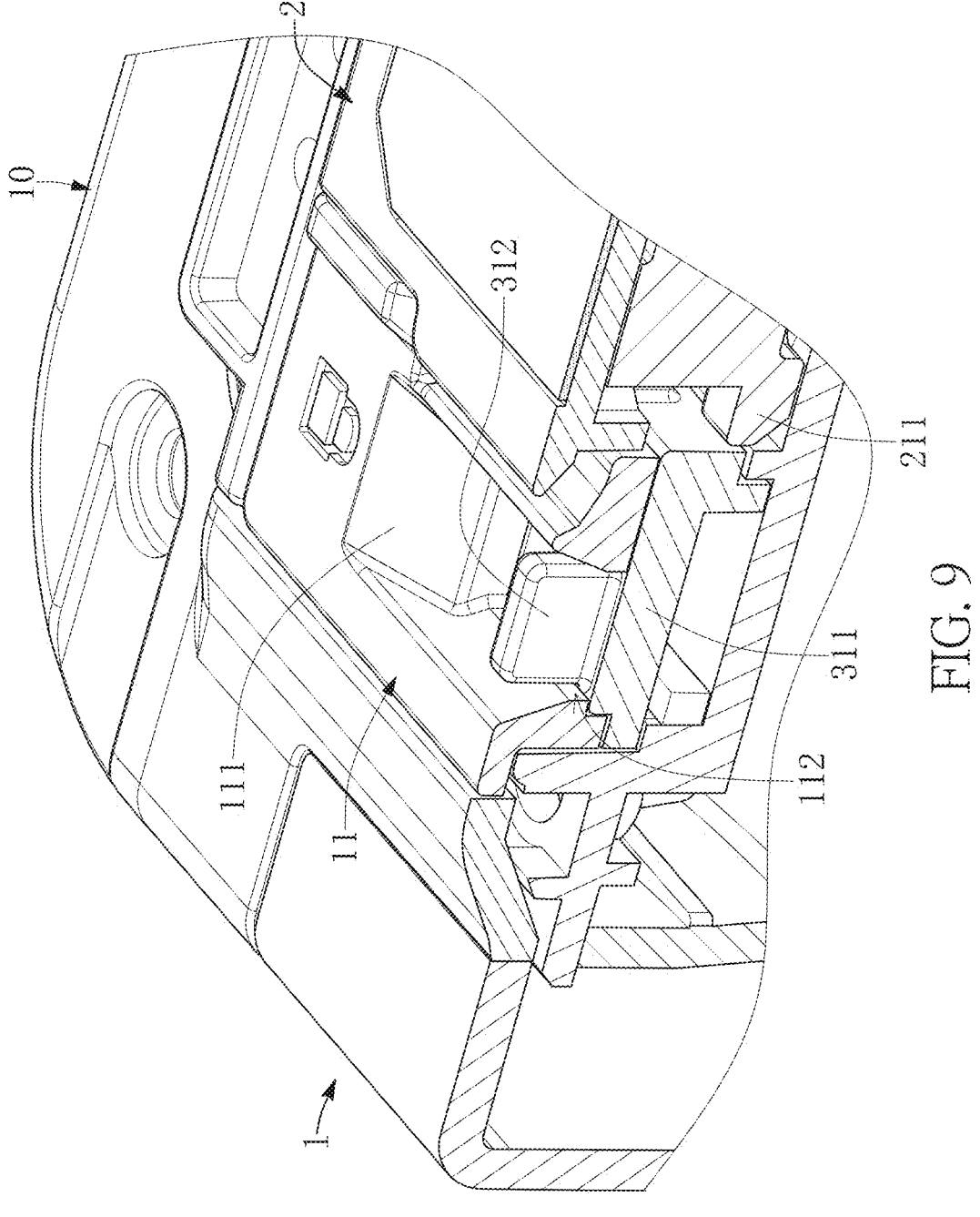
FIG. 9 is a schematic cross-sectional view of the electronic device according to the first embodiment of the present disclosure.

As shown in FIG. 5 to FIG. 9, FIG. 6 is a schematic cross-sectional view taken along line VI-VI of FIG. 2 according to the first embodiment of the present disclosure, FIG. 7 is a schematic cross-sectional view of the present embodiment, FIG. 8 is a schematic cross-sectional view taken along line VIII-VIII of FIG. 4 of the present embodiment, and FIG. 9 is a schematic cross-sectional view of the present embodiment.

The switch shell 11 of the housing 1 is fixed to the housing body 10 of the housing 1 through a threaded manner or an engaging manner. The switch shell 11 includes an inclined sidewall 111 and an opening 112, the inclined sidewall 111 surrounds the opening 112, and the opening 112 is a hole that penetrates the switch shell 11. When the switch shell 11 is fixed to the housing body 10, the switch shell 11 and the housing body 10 jointly define an activity space S. The activity space S is arranged in the housing 1, and the activity space S is in spatial communication with an external environment through the opening 112.

The pushing member 31 includes a main body 311 and a manipulation portion 312. The main body 311 is arranged in the activity space S, and the manipulation portion 312 protrudes from the opening 112. The manipulation portion 312 is configured to provide a manipulation of the user, such that the pushing member 31 can be moved between the locked position and the unlocked position. The main body 311 can include a threaded hole 3111, the limiting member 32 can be the screw, and the limiting member 32 can be threaded with the threaded hole 3111.

As shown in FIG. 2, FIG. 3, FIG. 6, and FIG. 7, when the pushing member 31 is located at the locked position as shown in FIG. 3, the threaded hole 3111 of the main body 311 is exposed from the opening 112, the threaded hole 3111 of the main body 311 and the opening 112 of the switch shell 11 are in spatial communication with each other, and the limiting member 32 can be threaded with the threaded hole 3111 through the opening 112. When the limiting member 32 and the threaded hole 3111 are threaded with each other, the limiting member 32 is located at the limited position, a top portion 321 of the limiting member 32 is located in the opening 112, and the top portion 321 is located between the manipulation portion 312 and the inclined sidewall 111. Accordingly, the manipulation portion 312 can be blocked by the top portion 321 and cannot be moved to the unlocked position as shown in FIG. 4.

As shown in FIG. 3, FIG. 4, FIG. 8, and FIG. 9, when the limiting member 32 is detached from the threaded hole 3111 and is not located at the limited position, the pushing member 31 located at the locked position as shown in FIG. 3 can be moved to the locked position as shown in FIG. 4 by being pushed. When the pushing member 31 is located at the unlocked position, the threaded hole 3111 is not exposed from the opening 112, and the threaded hole 3111 is arranged in the switch shells 11.

As shown in FIG. 4, in practice, the detachable electronic module 2 can include a casing 21, a plurality of electronic modules 22, and a connector 23, and the electronic modules 22 are disposed in the casing 21. The electronic modules 22 can include a circuit board and a plurality of random access memory, and the electronic modules 22 can be a solid-state drive (SSD). A part of the connector 23 is exposed from the casing 21, and the connector 23 is used for being connected to a connector arranged in the housing 1. The casing 21 includes two engaging portions 211 that are spaced apart from each other. When the detachable electronic module 2 is assembled into the accommodating chamber 101, the two engaging portions 211 are disposed adjacent to the switch mechanism 3. As shown in FIG. 4 and FIG. 5, the main body 311 of the pushing member 31 can include two barrier structures 313 that are spaced apart from each other. In another embodiment, the detachable module 2 includes a casing 21 with two engaging portions 211. The casing 21 can cover the accommodating chamber 101 of the housing 1.

As shown in FIG. 6 and FIG. 7, when the pushing member 31 is located at the locked position, the barrier structures 313 of the pushing member 31 are correspondingly located above the engaging portions 211 of the detachable electronic module 2. Accordingly, even if the limiting member 32 is not threaded with the threaded hole 3111, the detachable electronic module 2 is still blocked by the barrier structures 313 through the engaging portions 211, such that the detachable electronic module 2 cannot be detached from the accommodating chamber 101.

As shown in FIG. 8 and FIG. 9, when the pushing member 31 is located at the unlocked position, the threaded hole 3111 is not exposed from the opening 112, and the barrier structures 313 of the pushing member 31 are not located above the engaging portions 211 of the detachable electronic module 2, so that the relevant personnel can pull the detachable electronic module 2 to disassemble the detachable electronic module 2 from the accommodating chamber 101.

In conclusion, in one of the specific embodiments, the connection and position relationship among the housing 1, the limiting member 32, the pushing member 31, and the detachable electronic modules 2 (e.g., the detachable modules 2) can be implemented or provided according to the above description, but the present disclosure is not limited thereto.

Second Embodiment

Figure 10:
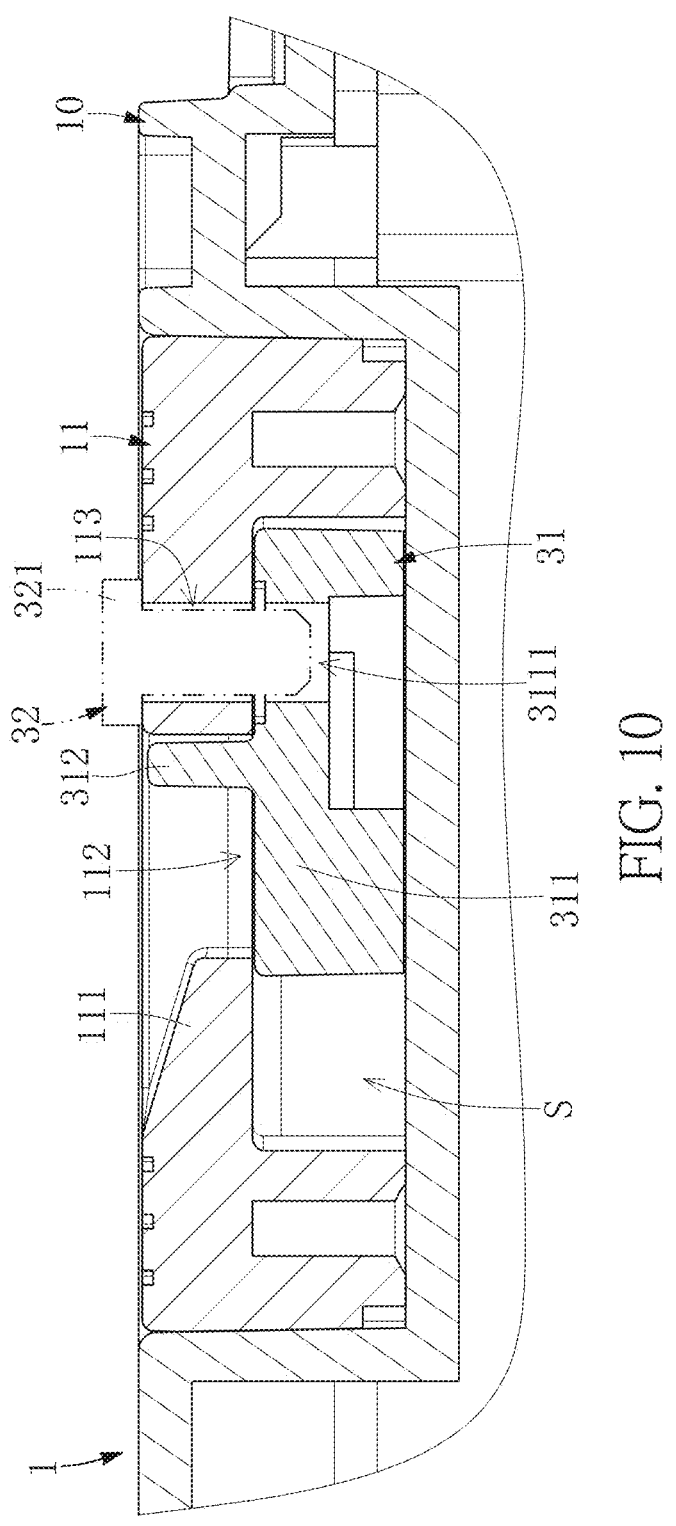
FIG. 10 is a schematic cross-sectional view of the electronic device according to a second embodiment of the present disclosure.

As shown in FIG. 10, FIG. 10 is a schematic cross-sectional view of the electronic device according to a second embodiment of the present disclosure. The main difference between the present embodiment and the first embodiment as shown in FIG. 6 is described as follows: the position of the threaded hole 3111 included by the main body 311 of the pushing member 31 in the present embodiment is different from the position of the threaded hole 3111 shown in FIG. 6, and the switch shell 11 of the housing 1 includes a through hole 113. In the present embodiment, when the pushing member 31 is located at the locked position, the threaded hole 3111 of the pushing member 31 and the through hole 113 of the switch shell 11 are in spatial communication with each other, and the limiting member 32 is capable of passing through the through hole 113 to be threaded with the threaded hole 3111. Accordingly, the pushing member 31 can be limited by the limiting member 32, such that the pushing member 31 cannot be moved to the unlocked position.

Third Embodiment

Figure 11:
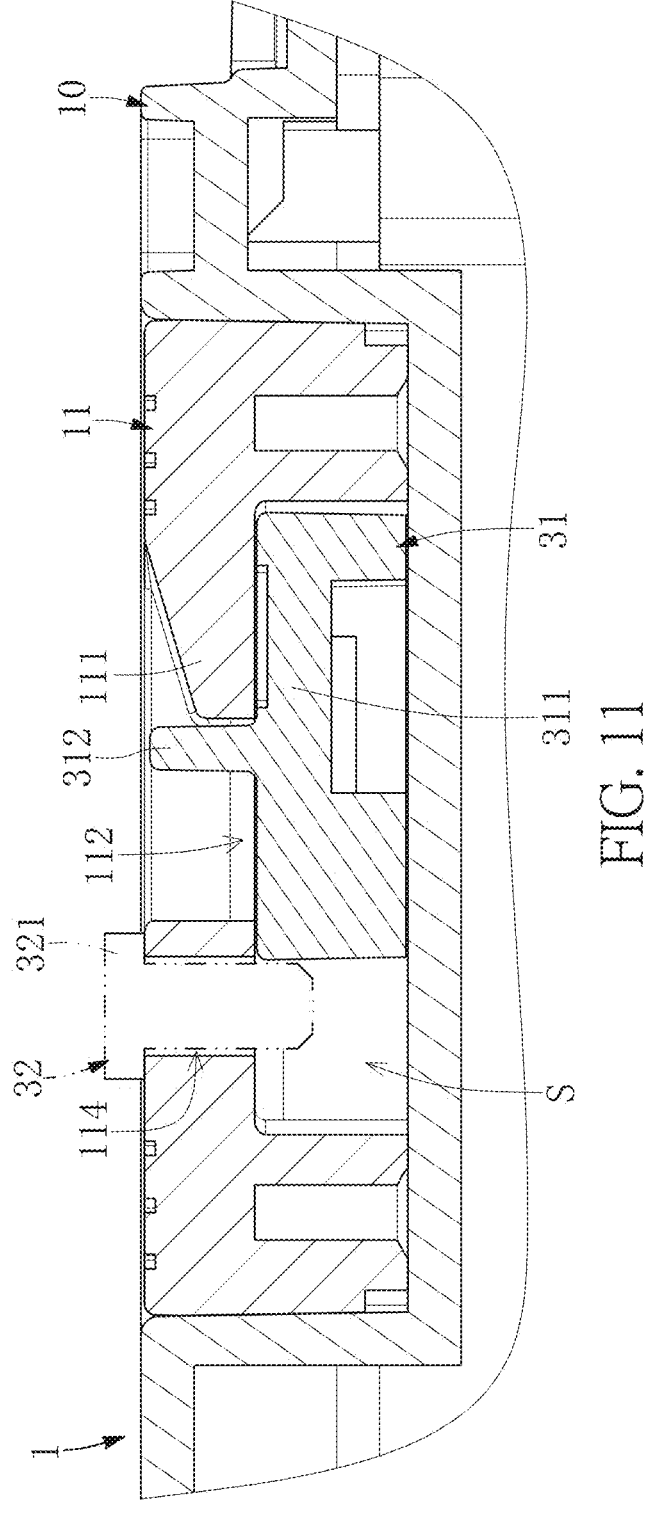
FIG. 11 is a schematic cross-sectional view of the electronic device according to a third embodiment of the present disclosure.

As shown in FIG. 11, FIG. 11 is a schematic cross-sectional view of the electronic device according to a third embodiment of the present disclosure. The main difference between the present embodiment and the first embodiment as shown in FIG. 6 is described as follows: the pushing member 31 in the present embodiment does not have the threaded hole, and the switch shell 11 has a threaded hole 114. In the present embodiment, when the pushing member 31 is located at the locked position and is threaded with the threaded hole 114 of the switch shell 11, a part of the limiting member 32 is arranged in the activity space S, so that the pushing member 31 is blocked by the part of the limiting member 32 arranged in the activity space S, and the pushing member 31 cannot be moved to the unlocked position. It should be noted that, the limiting member 32 threaded with the threaded hole 114 is mainly configured to prevent the pushing member 31 from being moved to the unlocked position, such that when the limiting member 32 is threaded with the threaded hole 114, the part of the limiting member 32 arranged in the activity space S is located on a path of the pushing member 31 from the locked position to the unlocked position.

Fourth Embodiment

Figure 12:
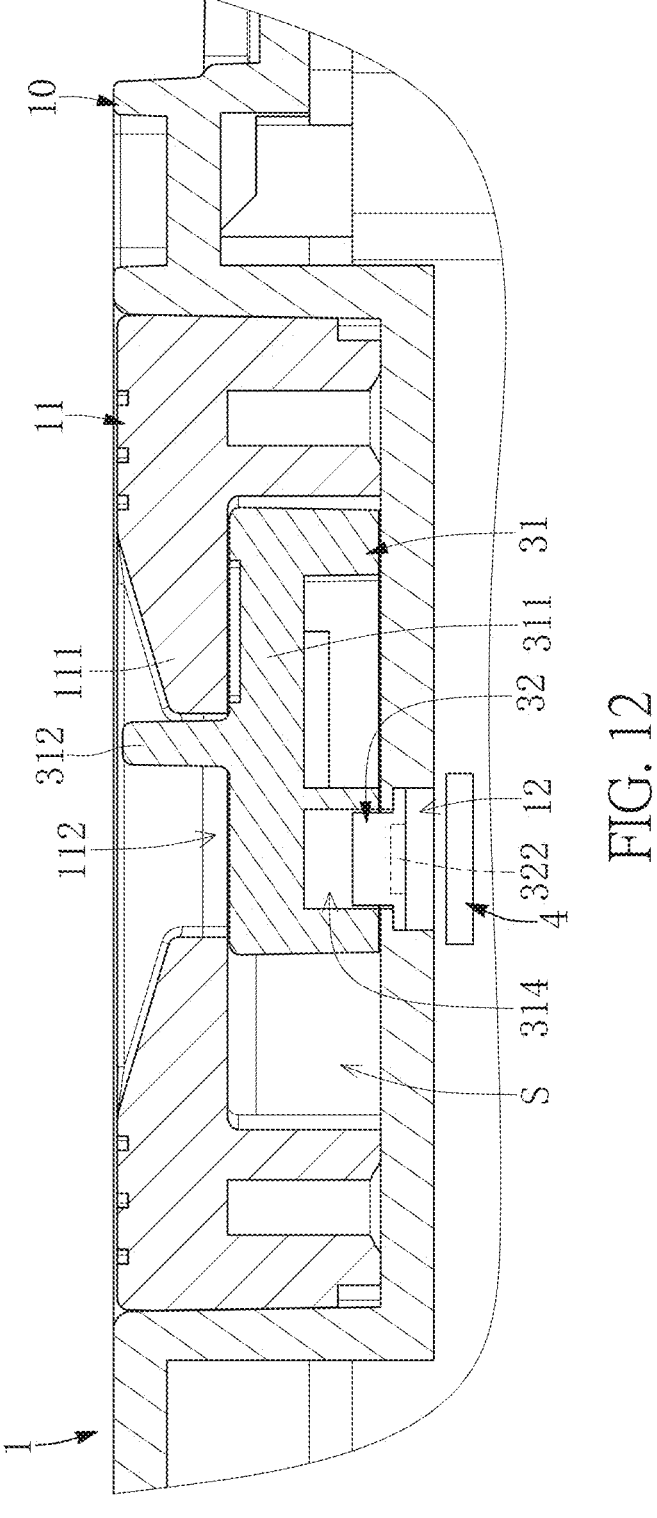
FIG. 12 and FIG. 13 are cross-sectional views showing the electronic device in different states according to a fourth embodiment of the present disclosure.
Figure 13:
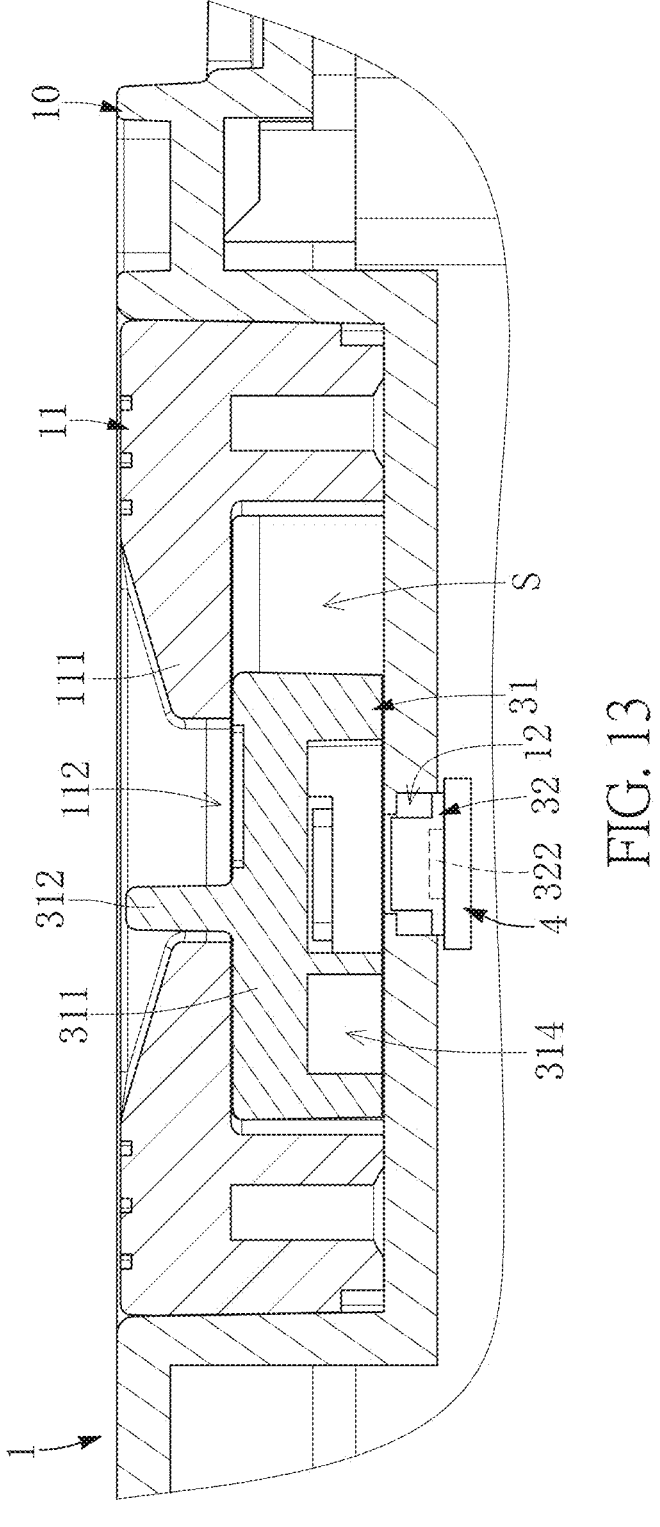
Figure 14:
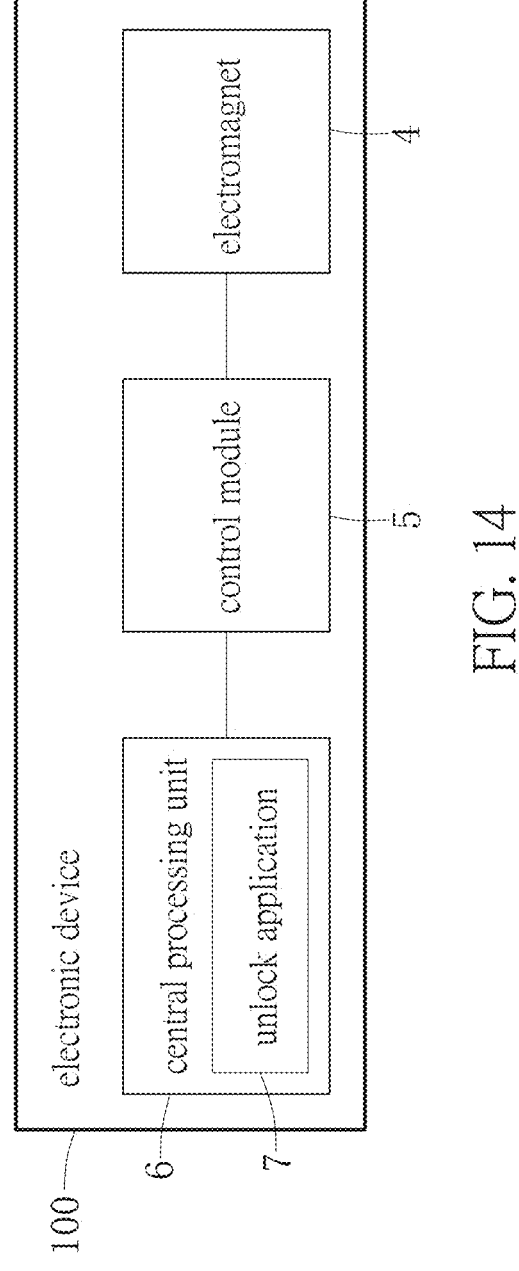
FIG. 14 is a block diagram of the electronic device according to the fourth embodiment of the present disclosure.

As shown in FIG. 12 to FIG. 14, FIG. 12 and FIG. 13 are cross-sectional views showing the electronic device in different states according to a fourth embodiment of the present disclosure, and FIG. 14 is a block diagram of the electronic device according to the present embodiment. The electronic device 100 can include an electromagnet 4 and a control module 5. The electromagnet 4 is electrically connected to the control module 5, and the control module 5 can be a microprocessor that is independent from a central processing unit 6 of the laptop computer. It should be noted that, in particular implementations, the control module 5 and the central processing unit 6 can also be integrated into a same module. The control module 5 is configured to control the electromagnet 4 to change a magnetism of the electromagnet 4. The electromagnet 4 is disposed in the housing 1, and the electromagnet 4 is disposed adjacent to the pushing member 31. The limiting member 32 is disposed in the housing 1, and at least part of the limiting member 32 has the magnetism. In practice, the limiting member 32 can include a permanent magnet 322 arranged therein. The limiting member 32 can be moved along an active channel 12 in the housing 1. In practice, the active channel 12 can be formed in a relevant support structure arranged in the housing 1, or the active channel 12 can be formed in a circuit board that is disposed in the housing 1.

As shown in FIG. 12, when the pushing member 31 is located at the locked position and the control module 5 controls the magnetism of the electromagnet 4 to be identical to the magnetism of the limiting member 32, the permanent magnet 322 in the limiting member 32 is moved to the limited position as shown in FIG. 12 along the active channel 12 because like poles repel one another. When the limiting member 32 is moved to the limited position, a part of the limiting member 32 is located in a through hole 314 of the pushing member 31, so that the pushing member 31 is limited by the limiting member 32 and cannot be moved to the unlocked position.

As shown in FIG. 13, when the control module 5 controls the magnetism of the electromagnet 4 to be opposite to the magnetism of the limiting member 32, the permanent magnet 322 of the limiting member 32 is moved from the limited position as shown in FIG. 12 to a non-limited position as shown in FIG. 13 because opposite poles attract each other, such that a part of the limiting member 32 is no longer located in the through hole 314 of the pushing member 31. When the limiting member 32 is not located in the through hole 314 of the pushing member 31, the pushing member 31 can be moved from the locked position to the unlocked position.

In summary, the central processing unit 6 of the electronic device 100 can be used to run an unlock application 7 in practical implementation. The unlock application 7 can be installed and executed in an operating system, but the present disclosure is not limited thereto. In a different embodiment, the unlock application 7 can be installed and executed in a basic input/output system (BIOS).

When the central processing unit 6 runs the unlock application 7, the user can see an application interface on a display of the electronic device 100, and the application interface can show fields that require the user to enter an account number and a password. When the user enters the correct account number and the correct password in the application interface, the central processing unit 6 can control the magnetism of the electromagnet 4 through the control module 5, so as to enable the limiting member 32 to be moved to the non-limited position. Accordingly, the pushing member 31 can be moved from the locked position to the unlocked position. Conversely, if the incorrect account number and the incorrect password are entered, the central processing unit 6 cannot control the magnetism of the electromagnet 4 through the control module 5, so that the limiting member 32 is maintained at the limited position, and the pushing member 31 cannot be moved to the unlocked position.

It should be noted that the positions of the limiting member 32 and the electromagnet 4 of present embodiment are just one of possible arrangements. In different embodiments, the positions of the limiting member 32 and the electromagnet 4 can be adjusted or changed according to FIG. 10 and FIG. 11. In different embodiments, as long as the limiting member 32 is located at the limited position by being driven from the electromagnet 4, and at least part of the limiting member 32 is located on a path of the pushing member 31 from locked position to unlocked position, the positions of the electromagnet 4 and the limiting member 32 can be changed according to practical requirements.

Fifth Embodiment

Figure 15:
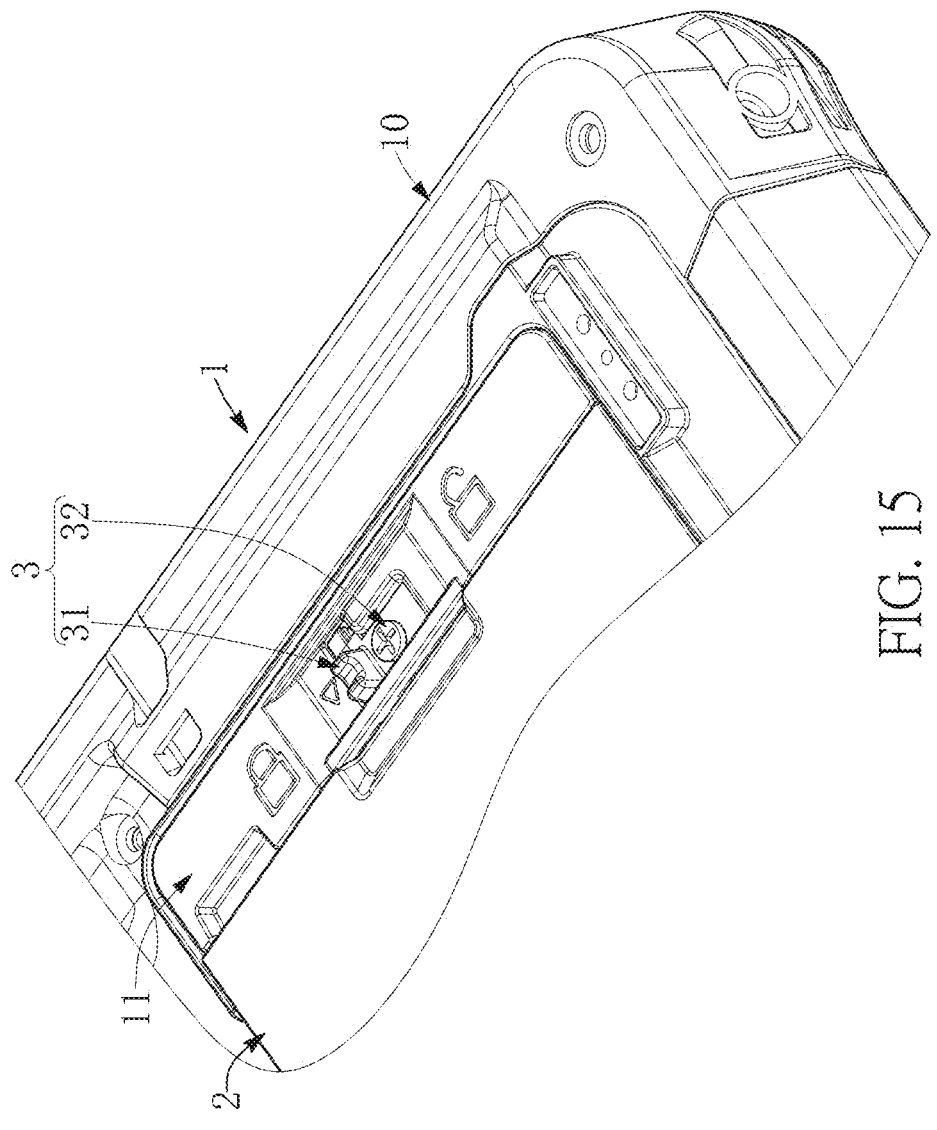
FIG. 15 is a schematic view of the electronic device according to a fifth embodiment of the present disclosure.
Figure 16:
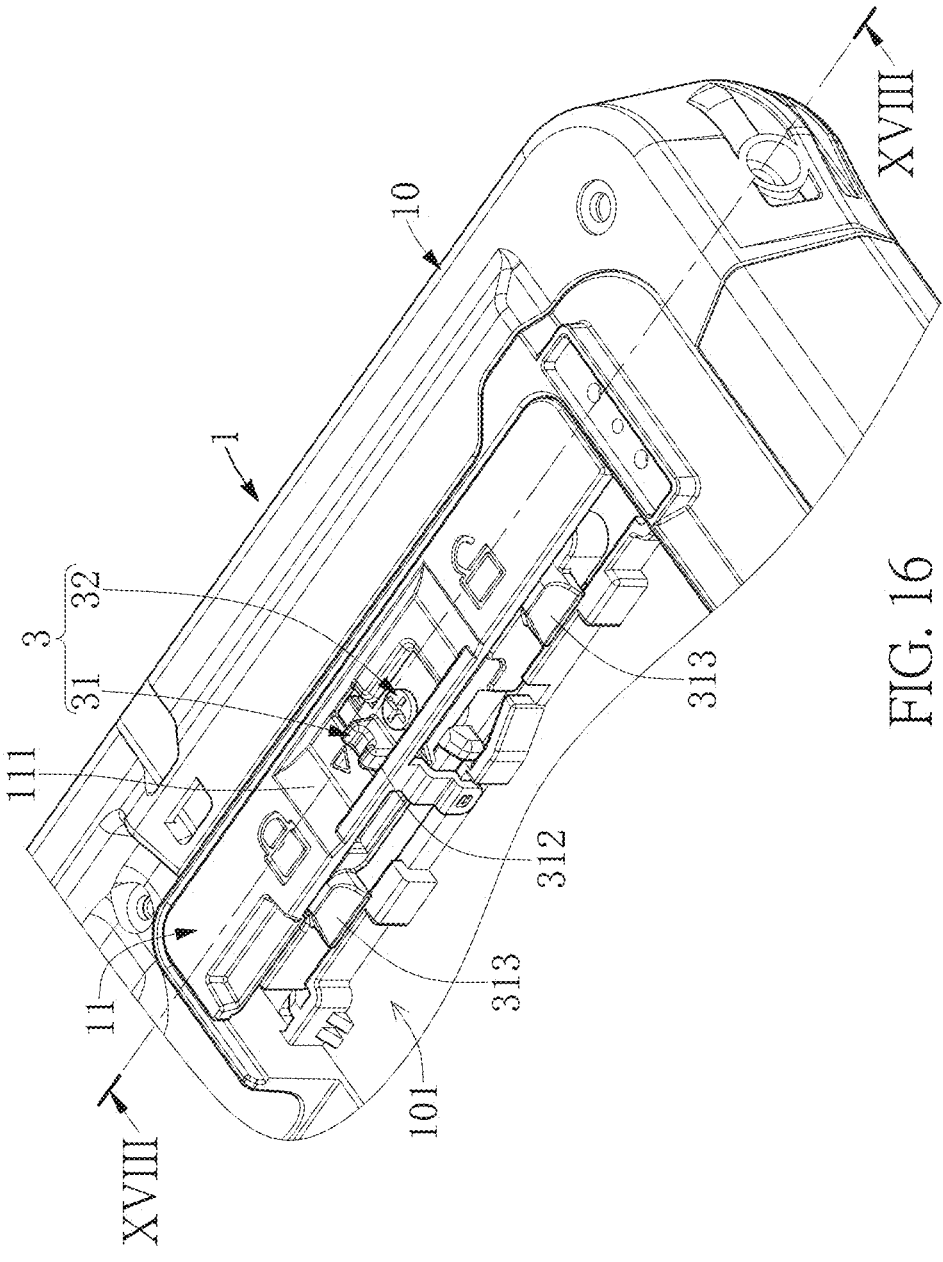
FIG. 16 is a partial schematic enlarged view of the electronic device according to the fifth embodiment of the present disclosure.
Figure 17:
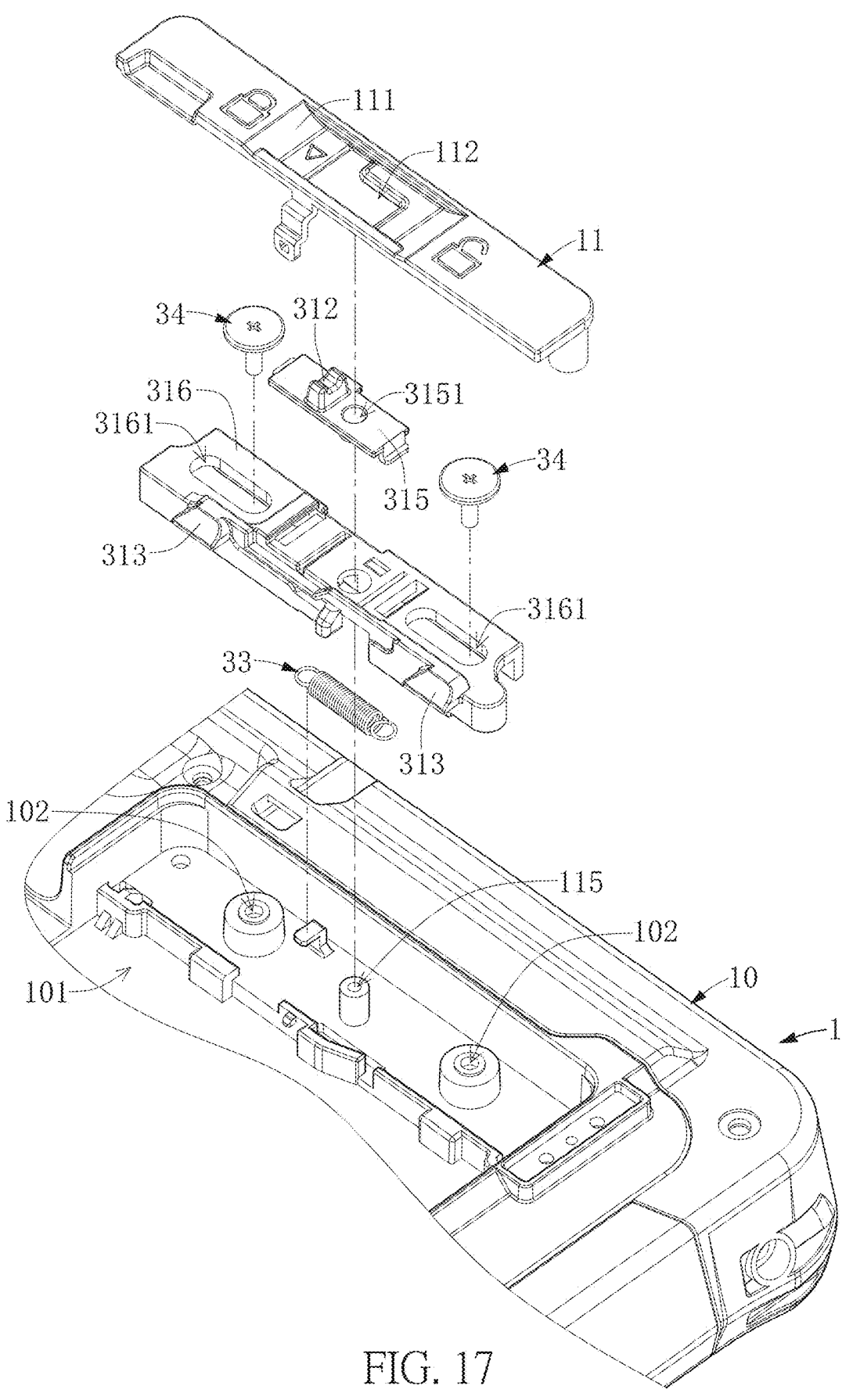
FIG. 17 is a partial schematic exploded view of the electronic device according to the fifth embodiment of the present disclosure.
Figure 18:
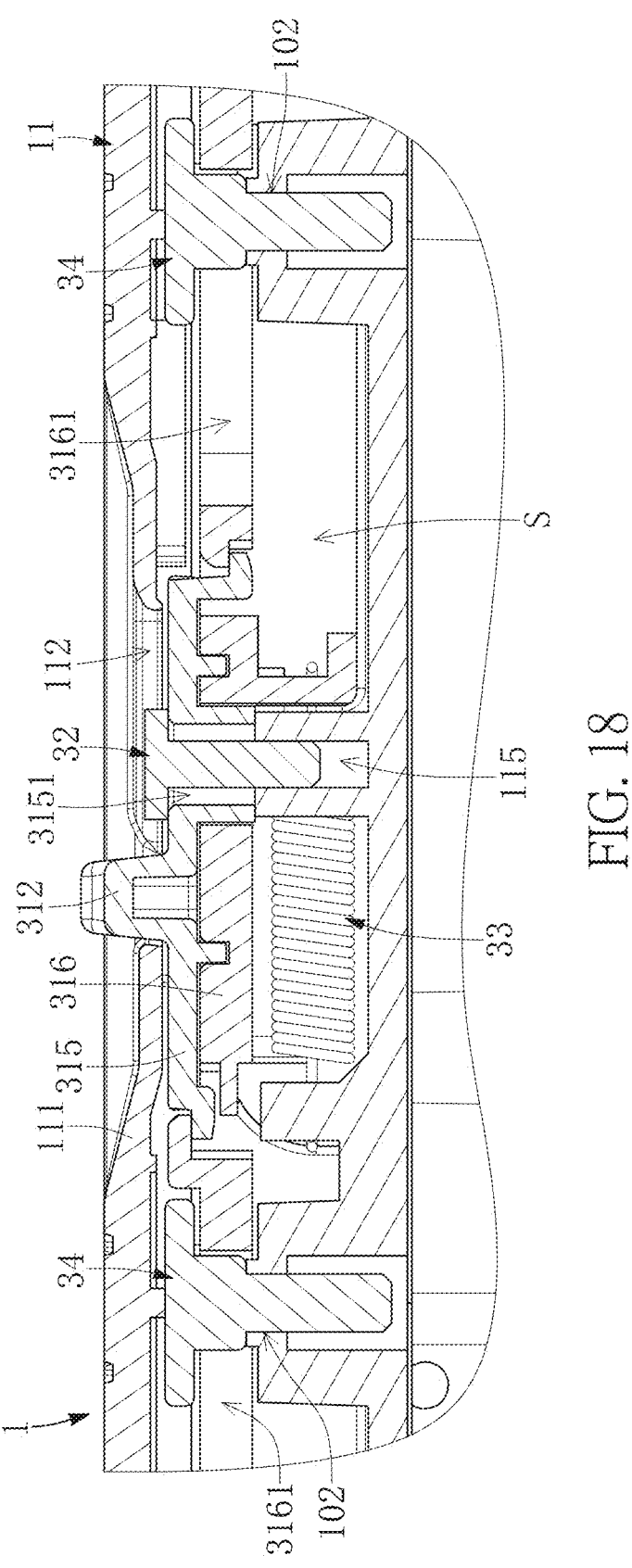
FIG. 18 is a schematic cross-sectional view taken along line XVIII-XVIII of FIG. 16 according to the fifth embodiment of the present disclosure.
Figure 19:
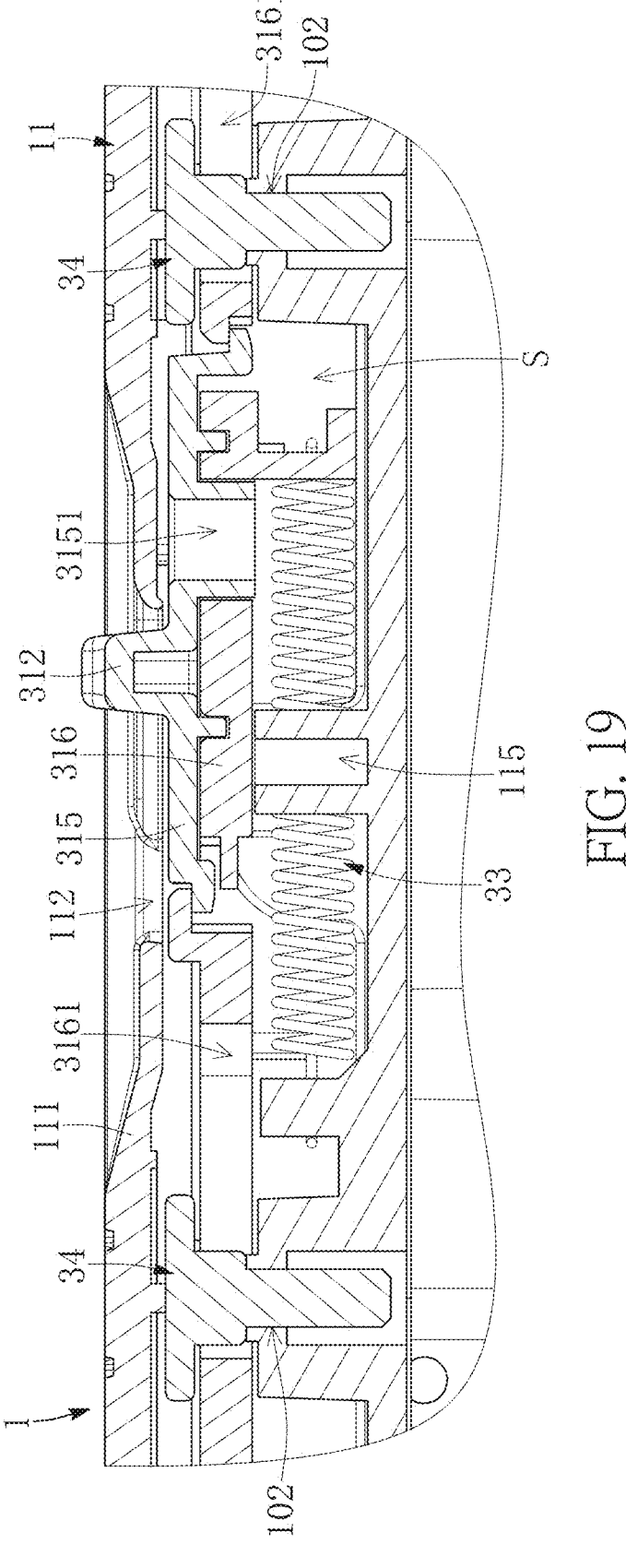
FIG. 19 is a schematic cross-sectional view of the electronic device according to the fifth embodiment of the present disclosure.

As shown in FIG. 15 to FIG. 19, FIG. 15 is a schematic view of the electronic device according to a fifth embodiment of the present disclosure, FIG. 16 is a partial schematic enlarged view of the electronic device according to the present embodiment, FIG. 17 is a partial schematic exploded view of the electronic device according to the present embodiment, FIG. 18 is a schematic cross-sectional view taken along line XVIII-XVIII of FIG. 16 according to the present embodiment, and FIG. 19 is a schematic cross-sectional view of the electronic device according to the present embodiment.

In the present embodiment, the detachable electronic module 2 can include a battery arranged therein. As shown in FIG. 15 to FIG. 17, the main difference between the present embodiment and the aforementioned embodiments is described as follows: the switch mechanism 3 of the present embodiment can include an elastic member 33, and two locking members 34. The pushing member 31 includes a first component 315 and a second component 316. The first component 315 is fixed to the second component 316. The second component 316 is movably disposed on the housing body 10.

In practice, the second component 316 can include two sliding grooves 3161. The two locking members 34 are threaded with the two threaded holes 102 of the housing body 10 through the two sliding grooves 3161, so that the second component 316 is slidably disposed on the housing body 10. The first component 315 includes the manipulation portion 312. The elastic member 33 can be a spring. Two ends of the elastic member 33 are respectively fixed to the housing body 10 and the second component 316. The second component 316 includes two barrier structures 313. The cooperation between the barrier structures 313 and the engaging portions 211 of the detachable electronic modules 2 are described in the above description and will be omitted herein for the sake of brevity.

As shown in FIG. 17 to FIG. 18, the first component 315 has a through hole 3151, and the housing body 10 has a threaded hole 115. When the pushing member 31 is located at the locked position, the through hole 3151 and the threaded hole 115 are in spatial communication with each other, the through hole 3151 and the threaded hole 115 are exposed from the opening 112 of the switch shell 11, and the limiting member 32 can be threaded with the threaded hole 115 by passing through the through hole 3151. Accordingly, the first component 315 and the second component 316 are fixed to the housing body 10 through the limiting member 32, and the pushing member 31 cannot be moved to the unlocked position.

As shown in FIG. 19, when the pushing member 31 is located at the unlocked position, the through hole 3151 of the first component 315 is arranged in the activity space S and is not exposed from the opening 112, and the elastic member 33 is in a stretched state. When the elastic member 33 is in the stretched state and the user does not manipulate the pushing member 31, the pushing member 31 can be affected by the elastic restoring force of the elastic member 33 so as to be moved from the unlocked position to the locked position.

It should be noted that, in one variation of the present embodiment, the first component 315 and the second component 316 can be integrally formed as a single one-piece structure; and in another variation of the present embodiment, the electronic device 100 can be provided without the elastic member 33. In any one of the above embodiments, the elastic member 33 of the present embodiment can be included according to practical requirements. The electromagnet 4 disclosed in the aforementioned embodiments can be combined with the pushing member 31 including the first component 315 and the second component 316 of the present embodiment so as to jointly form a new configuration.

In conclusion, in the electronic device provided by the present disclosure, the arrangement of the pushing member and the limiting member provided in the switch mechanism prevents the detachable electronic module (the detachable modules) from being easily detached from the housing according to practical requirements, thereby effectively improving on the above issues that the conventional detachable electronic modules (e.g., batteries or solid-state drives) assembled in the rugged laptop computer can easily detach from the housing and/or be stolen.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An electronic device, comprising:
a housing comprising an accommodating chamber;

a detachable electronic module detachably assembled to the accommodating chamber of the housing; and a switch mechanism disposed on the housing, and the switch mechanism comprising a pushing member and a limiting member, wherein the pushing member is movable relative to the housing between a locked position and an unlocked position;

wherein, when the detachable electronic module is assembled to the accommodating chamber and the pushing member is located at the unlocked position, the detachable electronic module is able to be disassembled from the accommodating chamber of the housing;

wherein, when the detachable electronic module is assembled to the accommodating chamber, the pushing member is located at the locked position and the limiting member is located at a limited position, such that the detachable electronic module is fixed to the housing, and the pushing member is limited by the limiting member to not be movable to the unlocked position; and wherein the limiting member comprises a manipulation hole, and the manipulation hole is configured to cooperate with a tool, such that the limiting member is located at the limited position or away from the limited position.

2. The electronic device according to claim 1, wherein the housing comprises an inclined sidewall, an opening, and an activity space; wherein the inclined sidewall surrounds the opening, the activity space is arranged in the housing, and the activity space is in spatial communication with an external environment through the opening; and wherein the pushing member comprises a main body and a manipulation portion, the main body is arranged in the activity space, and the manipulation portion protrudes from the opening.

3. The electronic device according to claim 2, wherein the main body comprises a threaded hole, and wherein, when the limiting member is threaded with the threaded hole, the limiting member is located at the limited position.

4. The electronic device according to claim 3, wherein, when the limiting member is located at the limited position, a top portion of the limiting member is located in the opening, and the top portion cooperates with the inclined sidewall, such that the pushing member is not movable to the unlocked position.

5. The electronic device according to claim 4, wherein, when the pushing member is located at the locked position, the threaded hole is exposed from the opening, and wherein, when the pushing member is located at the unlocked position, the threaded hole is not exposed from the opening.

6. The electronic device according to claim 1, wherein the housing comprises a through hole, and the pushing member comprises a threaded hole; wherein, when the pushing member is located at the locked position, the through hole and the threaded hole are in spatial communication with each other, and the limiting member is threaded with the threaded hole by passing through the through hole; and wherein, when the limiting member is threaded with the threaded hole, the limiting member is located at the limited position.

7. The electronic device according to claim 1, wherein the housing comprises a threaded hole, and wherein, when the limiting member is threaded with the threaded hole of the housing, a part of the limiting member is arranged in the housing, the limiting member is located at the limited position, and the pushing member is blocked by the limiting member arranged in the housing, such that the pushing member is not movable from the locked position to the unlocked position.

8. The electronic device according to claim 1, wherein the detachable electronic module comprises an engaging portion; wherein, when the pushing member is located at the locked position, the engaging portion is blocked by a barrier structure of the pushing member, such that the detachable electronic module is not able to be disassembled from the accommodating chamber of the housing; and wherein, when the pushing member is located at the unlocked position, the engaging portion is not blocked by the barrier structure, such that the detachable electronic module is able to be disassembled from the accommodating chamber of the housing.

9. The electronic device according to claim 1, wherein the electronic device comprises an elastic member disposed in the housing, an end of the elastic member is fixed to the housing, and a second end of the elastic member is fixed to the pushing member; and wherein, when the pushing member is located at the locked position or the unlocked position, the elastic member is stretched and elastically deformed.

10. The electronic device according to claim 1, wherein the detachable electronic module comprises a casing and an electronic module, the electronic module is disposed in the casing, and the electronic module is a solid-state drive or a battery.

11. The electronic device according to claim 1, wherein the housing comprises at least one guide structure, a part of the pushing member is slidably connected to the at least one guide structure, and the pushing member is slidable relative the housing through the at least one guide structure.

12. The electronic device according to claim 2, wherein the housing comprises a housing body and a switch shell, the housing body comprises the accommodating chamber, the switch shell is fixed to the housing body, the switch shell comprises the inclined sidewall and the opening, and the switch shell and the housing body jointly define the activity space.

13. An electronic device, comprising:

a housing comprising an accommodating chamber;

a detachable module detachably assembled to the accommodating chamber of the housing; and a switch mechanism disposed on the housing, and the switch mechanism comprising a pushing member and a limiting member, wherein the pushing member is movable relative to the housing between a locked position and an unlocked position;

wherein, when the detachable module is assembled to the accommodating chamber and the pushing member is located at the unlocked position, the detachable module is able to be disassembled from the accommodating chamber of the housing;

wherein, when the detachable module is assembled to the accommodating chamber, the pushing member is located at the locked position and the limiting member is located at a limited position, such that the detachable module is fixed to the housing, and the pushing member is limited by the limiting member to not be movable to the unlocked position; and wherein the limiting member comprises a manipulation hole, and the manipulation hole is configured to cooperate with a tool, such that the limiting member is located at the limited position or away from the limited position.

14. The electronic device according to claim 13, wherein the detachable module comprises a casing with an engaging portion; wherein, when the pushing member is located at the locked position, the engaging portion is blocked by a barrier structure of the pushing member, such that the detachable module is not able to be disassembled from the accommodating chamber of the housing; and wherein, when the pushing member is located at the unlocked position, the engaging portion is not blocked by the barrier structure, such that the detachable module is able to be disassembled from the accommodating chamber of the housing.

15. An electronic device, comprising:
a housing comprising an accommodating chamber;
a detachable electronic module detachably assembled to the accommodating chamber of the housing;
a switch mechanism disposed on the housing, and the switch mechanism comprising a pushing member and a limiting member, wherein the pushing member is movable relative to the housing between a locked position and an unlocked position;
an electromagnet; and
a control module;
wherein, when the detachable electronic module is assembled to the accommodating chamber and the pushing member is located at the unlocked position, the detachable electronic module is able to be disassembled from the accommodating chamber of the housing;
wherein, when the detachable electronic module is assembled to the accommodating chamber, the pushing member is located at the locked position and the limiting member is located at a limited position, such that the detachable electronic module is fixed to the housing, and the pushing member is limited by the limiting member to not be movable to the unlocked position; and
wherein, the electromagnet and the control module are disposed in the housing, at least part of the limiting member has a magnetism, the control module is configured to control a magnetism of the electromagnet, such that the magnetism of the electromagnet and the magnetism of the part of the limiting member are same as or different from each other to enable the limiting member to be movable between the limited position and a non-limited position; wherein, when the detachable electronic module is assembled to the accommodating chamber, the pushing member is located at the locked position, the limiting member is located at the non-limited position, and the pushing member is movable to the unlocked position.

16. The electronic device according to claim 15, wherein the limiting member comprises a permanent magnet arranged in the limiting member.

17. The electronic device according to claim 15, wherein the housing comprises an inclined sidewall, an opening, and an activity space, the inclined sidewall surrounds the opening, the activity space is arranged in the housing, and the activity space is in spatial communication with an external environment through the opening; wherein the pushing member comprises a main body and a manipulation portion, the main body is arranged in the activity space, the manipulation portion protrudes from the opening, and the main body comprises a through hole; wherein, when the limiting member is located at the limited position, a second part of the limiting member is disposed in the through hole; and wherein, when the limiting member is located at the non-limited position, the limiting member is not disposed in the through hole, and the pushing member is movable between the unlocked position and the locked position.

18. The electronic device according to claim 15, wherein the electronic device further comprises a central processing unit, the central processing unit is electrically connected to the control module, the central processing unit is configured to run an unlock application, and the unlock application comprises an application interface; and wherein, when a correct password is entered into the application interface, the unlock application is configured to control the control module through the central processing unit to change the magnetism of the electromagnet to enable the limiting member to move to the non-limited position or the limited position.

* * * * *